(12) United States Patent
Bohlmann et al.

(10) Patent No.: US 9,491,266 B2
(45) Date of Patent: Nov. 8, 2016

(54) REPRESENTATIONAL STATE TRANSFER COMMUNICATIONS VIA REMOTE FUNCTION CALLS

(71) Applicants: Karsten Bohlmann, Rauenberg (DE); Steffen Huester, Ubstadt-Weiher (DE); Sven Kobler-Morris, Heidelberg (DE); Holger Koser, Ubstadt-Wiher (DE); Michael Schneider, Angelbachtal (DE); Thomas Alexander Ritter, Heidelberg (DE); Eric Westenberger, Schwetzingen (DE)

(72) Inventors: Karsten Bohlmann, Rauenberg (DE); Steffen Huester, Ubstadt-Weiher (DE); Sven Kobler-Morris, Heidelberg (DE); Holger Koser, Ubstadt-Wiher (DE); Michael Schneider, Angelbachtal (DE); Thomas Alexander Ritter, Heidelberg (DE); Eric Westenberger, Schwetzingen (DE)

(73) Assignee: SAP SE, Walldorf (DE)

(*) Notice: Subject to any disclaimer, the term of this patent is extended or adjusted under 35 U.S.C. 154(b) by 695 days.

(21) Appl. No.: 13/692,646

(22) Filed: Dec. 3, 2012

(65) Prior Publication Data
US 2014/0156726 A1 Jun. 5, 2014

(51) Int. Cl.
H04L 29/06 (2006.01)
G06F 9/54 (2006.01)
(52) U.S. Cl.
CPC ............... *H04L 69/18* (2013.01); *G06F 9/541* (2013.01); *G06F 9/547* (2013.01)
(58) Field of Classification Search
CPC ......... H04L 29/06; G06F 9/547; G06F 9/541
USPC ........................................................ 709/203
See application file for complete search history.

(56) References Cited

U.S. PATENT DOCUMENTS

| 2008/0140861 | A1* | 6/2008 | Kothari et al. | 709/246 |
| 2010/0031233 | A1* | 2/2010 | Li et al. | 717/106 |
| 2011/0154302 | A1* | 6/2011 | Balko et al. | 717/140 |
| 2011/0161465 | A1* | 6/2011 | Kowalski | 709/219 |
| 2011/0282969 | A1* | 11/2011 | Iyer et al. | 709/217 |
| 2012/0179779 | A1* | 7/2012 | Awasthi | 709/217 |
| 2013/0124611 | A1* | 5/2013 | Thormaehlen et al. | 709/203 |
| 2013/0246646 | A1* | 9/2013 | Iliev et al. | 709/232 |

OTHER PUBLICATIONS

Shan Yu, Building a RESTful integration for SAP using WebSphere Adapter and WebSphere Process Server, Part 1: Outbound, IBM developerworks, 2010.*
Adi Kavaler, "SAP Netweaver Gateway Extends the Reach of SAP Business Applications," retrieved from a web article, Jul. 2011.*
Anonymous: "Remote Function Call." *Wikipedia: The Free Encyclopedia.* Wikimedia Foundation, Inc., Oct. 11, 2012. Web. Jun. 7, 2016. Retrieved from the Internet: URL:https://en.wikipedia.org/w/index.php?title=Remote_Function_Call&oldid=517240627.
Anonymous: "Representational state transfer." *Wikipedia: The Free Encyclopedia.* Wikimedia Foundation, Inc., Dec. 31, 2011. Web. Mar. 27, 2015. Retrieved from the Internet: URL:https://en.wikipedia.org/w/index.php?title=Representational_state_transfer&oldid=468744828.

* cited by examiner

*Primary Examiner* — Nicholas Taylor
*Assistant Examiner* — Chong G Kim
(74) *Attorney, Agent, or Firm* — Mintz Levin Cohn Ferris Glovsky and Popeo, P.C.

(57) ABSTRACT

A business application backend system, such as an Advanced Business Application Programming backend can receive and respond to representational state transfer (RESTful) service requests via both HTTP and Remote Function Call (RFC) protocols. In particular, the backend system extracts the RESTful service requests and fulfills the extracted requests using a protocol-independent resource controller. Related apparatus, systems, techniques and articles are also described.

22 Claims, 3 Drawing Sheets

REPRESENTATIONAL STATE TRANSFER COMMUNICATIONS VIA REMOTE FUNCTION CALLS

TECHNICAL FIELD

The subject matter described herein relates to the enablement of representational state transfer (RESTful) communications/services via Remote Function Call (RFC) protocol.

BACKGROUND

Hypertext Transfer Protocol (HTTP) is a communication protocol that is a widely used public standard for distributed, collaborative, hypermedia information systems. In particular, HTTP is the protocol for browser-based applications and can be advantageous in that additional libraries are not needed to be installed on client computing systems in order to execute various applications. For cloud services (i.e., applications which are accessed through the public internet, etc.), HTTP is often the only protocol which is supported by hosting service providers. However, some applications such as integrated development environments (IDEs) are not always fully compatible with HTTP.

SUMMARY

In a first aspect, a business application backend system receives one or more service requests from a client. Thereafter, at least one representational state transfer request is extracted from the one or more service requests. Next, the backend system, using a protocol-independent resource controller, fulfills the one or more service requests by executing the at least one extracted representational state transfer request.

One or more of the service requests can be a remote function call (RFC) format request and the extracting can include evaluating the RFC request to extract the representational state transfer request. In addition, one or more of the service requests can be in Hypertext Transfer Protocol (HTTP) format and the extracting can include evaluating the HTTP format request to extract the representational state transfer request.

The backend system can be any of a variety of systems including, for example, an Advanced Business Application Programming (ABAP) backend system encoded in ABAP language. Such an ABAP backend system provides a built-in application development environment for the ABAP programming language. Besides the standard front-end SAP GUI, this development environment can also be used with an independent front-end component, such as an integrated development environment (IDE). In particular, such an IDE can be based on the Eclipse platform. With such variations, the ABAP backend system can provide development infrastructure (DI) services having RESTful application programming interfaces (APIs) for integration of development tools. Such DI services can use resource controllers to provide access to resources in a data store of the ABAP backend system. In addition or in the alternative, the service requests can include uniform resource identifiers (URIs) specifying requested resources.

In an interrelated aspect, a system includes at least one first computing system having at least one data processor and at least one second computing system having at least one data processor executing a business application backend system with a protocol-independent resource controller. The backend system receives one or more service requests from the at least one first computing system specifying requested resources, the service requests being in both Remote Function Call (RFC) format and in Hypertext Transfer Protocol (HTTP) format, and fulfills the one or more service requests using the protocol-independent resource controller.

Computer program products are also described that comprise non-transitory computer readable media storing instructions, which when executed by at least one data processor of one or more computing systems, causes the at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the current subject matter provides the ability to implement RESTful services and make them accessible both via standard HTTP protocol and the SAP-proprietary RFC protocol and thereby leveraging the advantages of both protocols. In particular, the current subject matter can facilitate and significantly speed up the later integration of any tools into ABAP (Advanced Business Application Programming) in Eclipse and other clients.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
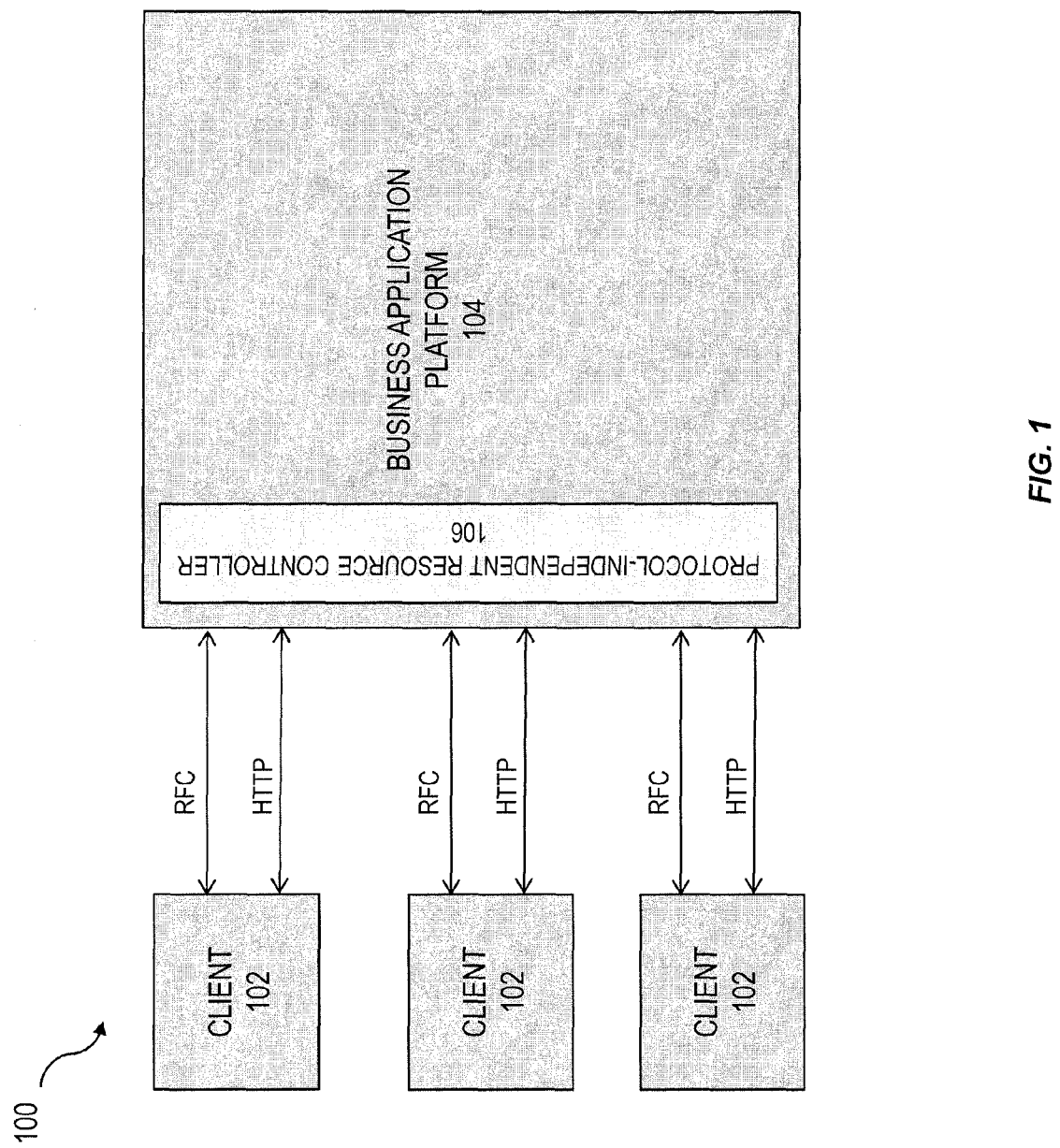
FIG. 1 is a system architecture diagram illustrating a business application back-end communicating with a plurality of clients according to one or more variations.

As illustrated in the diagram 100 of FIG. 1, the current subject matter is directed to a business application backend system 104 such as a backend system encoded in Advanced Business Application Programming language (ABAP) that can process, using a protocol-independent resource controller 106, representational state transfer (RESTful) service requests encapsulated in both Remote Function Call (RFC)-format requests as well as HTTP-format requests from a plurality of clients 102. While the following, for illustrative purposes, describes an arrangement in which the client is executed an integrated development environment (IDE), it will be appreciated that the current subject matter applies to any type of client or group of clients that execute Remote Function Call (RFC) and HTTP requests.

Integrated Development Environments (IDEs) such as the Eclipse client offer a modern UI with fast client-side rendering, multi-threading, and multiple views in the same context. With the current subject matter, the Eclipse client can be used to connect with multiple business application backend systems at the same time, including ABAP backend systems, even of different versions. With business application backend systems such as the ABAP backend system, development takes place online, i.e. directly on the business application backend system. As one consequence, one does not have to synchronize the content of whole backend systems to a local system to search and navigate to any development object.

By means of service-enabling of an infrastructure such as the ABAP development infrastructure, the business application backend as described herein offers a set of RESTful services (representational state transfer). Developers can, for example, use such services to build compelling tools for various environments including the ABAP development environment. The services themselves are language and platform independent and are designed for easy consumption by any type of client (not only ABAP in Eclipse). For the client-server communication, an HTTP-like protocol can be used which is implemented on top of the RFC protocol. This means that technically, the communication is done by Remote Function Calls to one specific function module, but the semantics of this communication follows the HTTP standard (with some minor deviations). Most requests use stateless connections, but there are some exceptional cases using stateful connections. The domain-specific resource implementations could also be exposed through an Internet Connection Framework (ICF) service, so that other clients could use them via HTTP.

Figure 2:
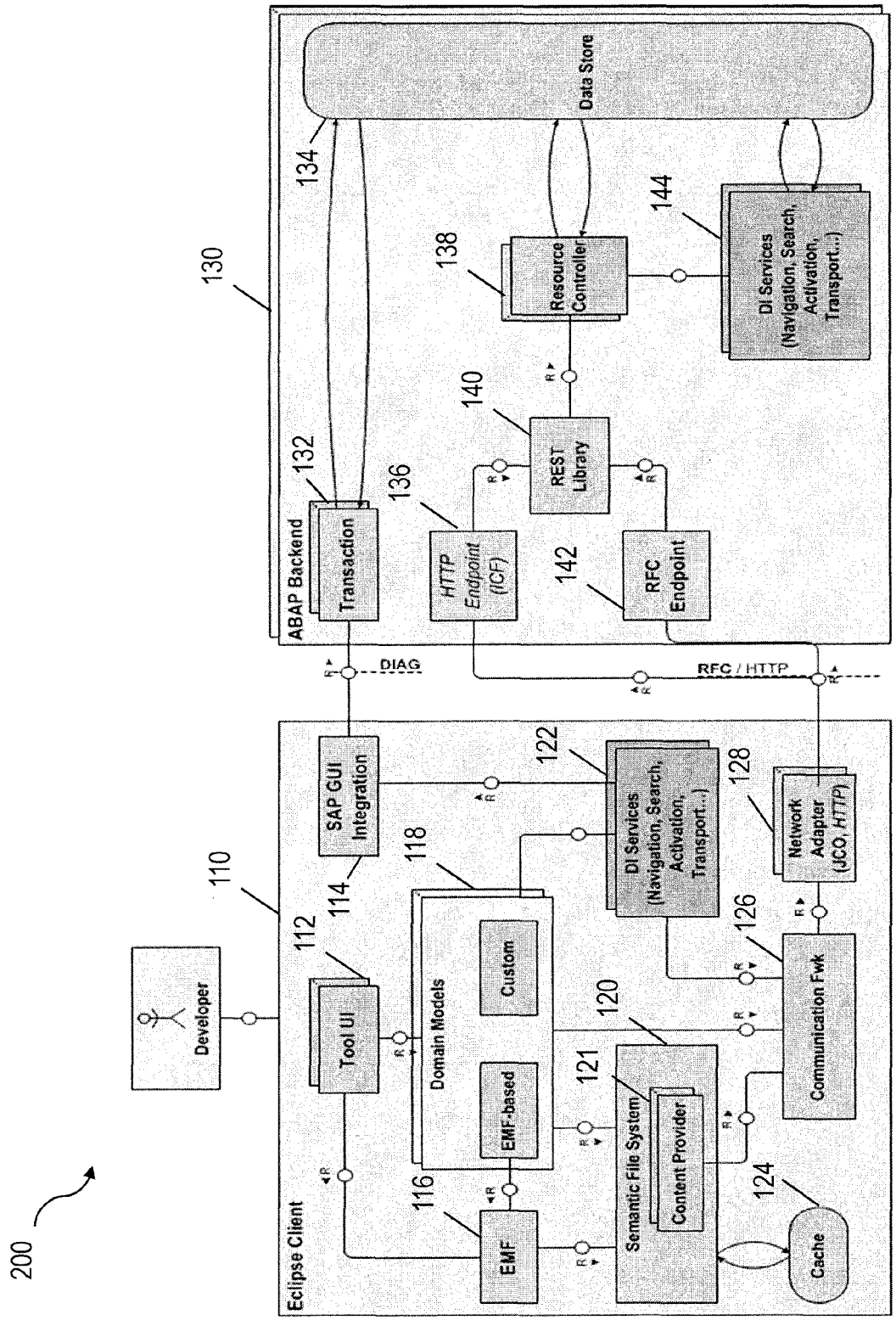
FIG. 2 is a system architecture diagram illustrating a client interacting with an ABAP platform according to one or more variations.

FIG. 2 is a system diagram 200 illustrating a client 110 and an ABAP backend system 130. The client 110 can execute various applications including, but not limited to, an integrated development environment (IDE) such as the Eclipse IDE. The client 110 can communicate with the ABAP backend system 130 and its data store 134 using a network adapter 128 (using Java Connector, HTTP, etc.) at the client 110 to both an HTTP endpoint 136 (internet connection framework (ICF)) and to an RFC endpoint 142. In addition, a developer can interact with the IDE via a tool user interface (UI) 112.

Both the client 110 and the ABAP backend system 130 can offer development infrastructure (DI) services via respective modules 122, 144. The DI services 144 in the ABAP Backend system 130 can provide an open set of development tools and their corresponding frameworks such as, for example, SE80 (a repository browser maintaining application components)/ABAP Workbench, SE09/Change and Transport System (CTS), Repository Information System (RIS), Version Management, Debugger, and more. The DI services 144 can be provided via a clean layer (i.e., a layer without a UI) for such tools and frameworks so that they can, in turn, be utilized by remote tools (e.g., tools in the client 110, etc.).

The DI Services 144 can provide different plug-in mechanisms to enable easy integration of new object types. These can be created by providing domain specific metadata (Object Type Metadata), and implementations for the integration and tool logic (DI plugins). In addition to new workbench object types, new DI Services can be created to provide service-enabling of existing tools and frameworks such as: Debugger, ABAP Test Cockpit, SAT Runtime Analysis, etc.

The DI Services 144 can provide RESTful service APIs for the integration of development tools. A separate DI remote services layer can, in some implementations, be provided that wraps the DI Services 144 API (mostly stateful and table-oriented) to a REST API (mostly stateless and XML-oriented). The DI Services 144 can provide out-of-the-box support for some common backend functionality.

Generic resource controllers 138 can be provided that enable browsing the system content, and provide activation services, search and where-used list, etc. Domain-specific resource controllers 138 for new object types can be easily implemented by inheriting from the base classes, which provide basic integration into DI Services 144. REST architectures Uniform Resource Identifiers (URIs) can be used to address and identify resources, (i.e. development artifacts such as ABAP classes, etc.). A pluggable URI mapping service can be used to map URIs into workbench requests (object name, object type) and vice versa.

The IDE executed on the client 110 (e.g., the Eclipse platform, etc.) (including its tools and services) can be based on a local workspace concept built on top of a local file system that requires a coupling between remote resources and local files. To avoid the need of synchronizing large amounts of artifacts to the client, a virtual file system referred to as a semantic file system (SFS) 120 with an accompanying cache 124 can be used. This technology can enable on-the-fly coupling of remote resources with local files. This way, resources can be loaded on demand.

For the integration of a concrete backend repository, the SFS 120 can offer a service-provider interface with which SFS content providers 121 can be plugged-in. The ABAP in Eclipse framework provides generic base classes for such content providers 112 which can be extended. In the simplest case, the domain-specific content provider functionality can be defined declaratively via (domain specific) object type metadata in the client. In addition to the Eclipse file-to-backend resource URI mapping information, the object type metadata can comprise labels, icons, actions and other declarative information specific to an object type that is used by the DI Services 122, 144 and different generic tools.

Once remote resources are available as local files, domain models 118 including a domain specific content model can be used by the Eclipse tools to read and manipulate the in-memory representation of the resource content. For object types that use an XML representation, the Eclipse Modeling Framework (EMF) 116 can be used.

Multiple tools can build up the UI layer of ABAP in Eclipse. They can comprise a rich set of editors, views, wizards, dialogs, etc. Some of these UI components are Eclipse standard, for example the Problems View; others are generic for ABAP development objects, such as the extensible Project Explorer View, the Open ABAP Development Object Dialog, etc.

Natively supporting an object type can require providing at least one domain-specific Editor and, optionally, a Creation Wizard, customized Properties View, etc. Object types, for which there is still no native editor support, can be edited in the ABAP in Eclipse environment by means of an embedded SAP GUI via an SAP GUI integration module 114 which interacts with a transaction module 132 in the ABAP backend system 130. This can be also used to run any Dynpro transaction in the client 110.

ABAP in Eclipse follows the single-client approach of the SAP GUI—this means that the latest client version must work with any enabled backend version. Newer backend versions do not necessarily need to support older client versions, i.e. they might require an update of the client. For realizing this requirement, tools can follow the HATEOAS (Hypermedia as the Engine of Application State) principle of the REST architecture (i.e., the actions of the client are triggered by following hyperlinks sent by the server in the resource representations of the corresponding service, etc.).

In addition, the ABAP in Eclipse SDK (according to the current subject matter) can include a compatibility and feature discovery framework (part of the DI Services 122, 144). The ABAP backend system 130 can provide a dedicated resource via a REST Library 140, which contains available features of this system. These features can be organized in a graph where the nodes represent specific capabilities or behaviors and the edges dependencies between nodes. The client 110 can also maintain a set of known features as part of a communications framework 126 (which is coupled to the SFS 120 and the DI Services module 122 to orchestrate communications with the ABAP platform 132 via the network adapter 128). By declaring dependencies as obligatory, the ABAP backend system 130 can enforce a client 110 update.

With the current subject matter, extensions can range from client 110 only enhancements such as providing a graphical viewer for an existing editor, to new workbench object types, including backend integration, remote API, Eclipse editor, wizards, etc. The creation of a new workbench object types can start with defining a logical transport object in a Change and Transport System (CTS) (transaction SOBJ). After this, the integration into the development infrastructure frameworks (Workbench, RIS, Versioning, etc.) can be declared using an object type editor, where a user can provide general information about the new object type, and declare the ABAP classes which build-up the corresponding backend plug-ins.

Using available base classes, the implementation of a resource controller 138 for the new object type can be almost reduced to providing a content handler, responsible for creating and consuming the content of the REST resource in XML form. The next steps comprise registering the new resource controller 138 and to provide the mapping between the new URIs, which identify the new resource types, and the new Workbench object type. With this scenario, the contract between the client 110 and the ABAP backend system 130 comprises: (i) the URI layout, which defines how the address of the new Resources looks like, and (ii) the XSD (XML Schema Definition), which defines the structure of the resource content.

In order to define client-side metadata for a new object, at the client 110 side, information must be provided about the URI and the file layout to be used for the REST resources of the new object type. Also icons and other information can be provided using Eclipse extension points in the plug-in definition.

In order to create a content metamodel, for the XSD, which defines the content format of the Resources, an ECore metamodel and the corresponding EMF Java classes can be automatically generated.

An Eclipse editor for the new object type can be easily implemented using basis classes which provide the necessary integration with the semantic file system 120, Locking and Transport Selection dialog. The implementation task consists of providing the UI controls and the data bindings between the EMF model 116 and the UI 112. In addition, in some implementations, a native Eclipse wizard can be provided to create new development objects of the new object type.

It will be appreciated that the current subject matter allows for a web-based programming environment for the ABAP stack with HTTP based access to the backend resources. With access via HTTP, lightweight integration scenarios (sometimes called mash-ups) can be enabled. Examples include: (a) dynamically displaying the edit date of an object in the wiki page which documents the object via a simple background HTTP call to the development system; (b) displaying or updating the status of development objects in internal social networks; and (c) retrieving results from quality test runs and display them on a wiki page so the team has all important information in one place.

Figure 3:
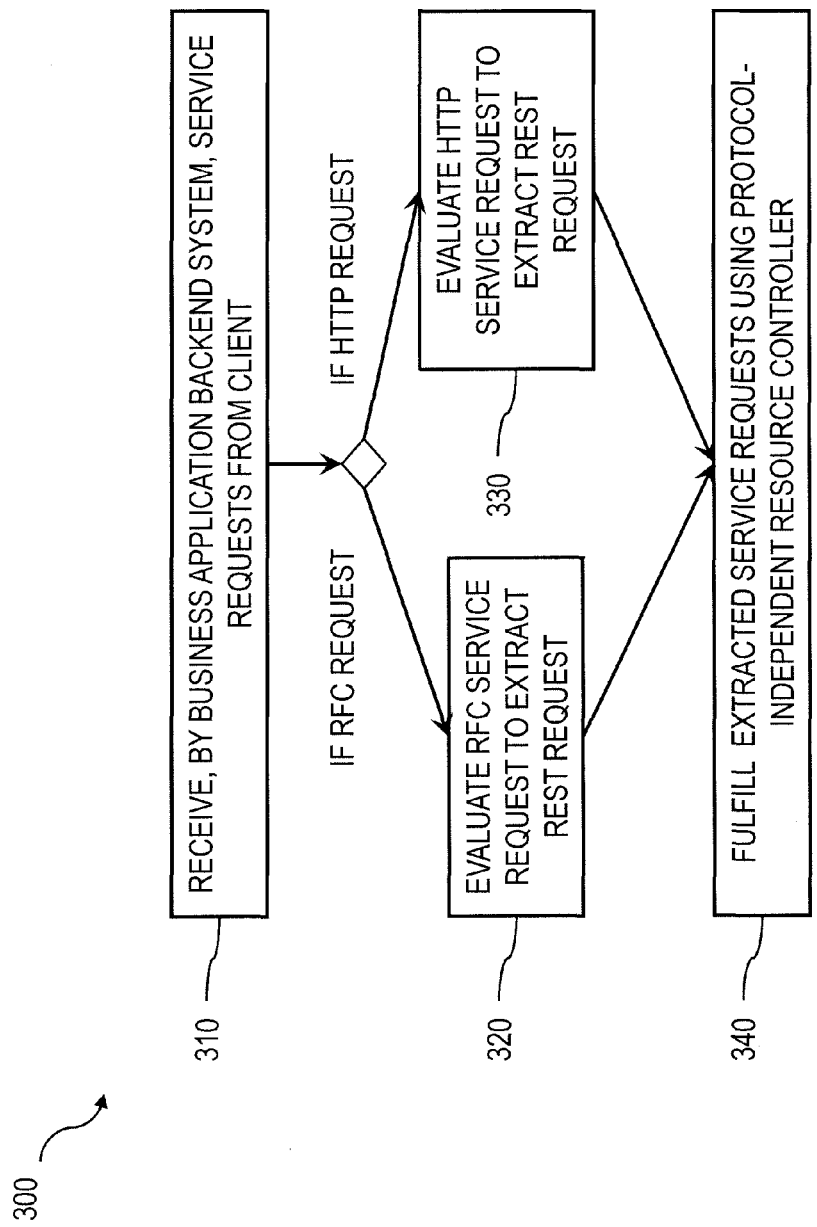
FIG. 3 is a process flow diagram illustrating provision of RESTful communications via RFC according to one or more variations.

FIG. 3 is a process flow diagram illustrating a method 300 in which, at 310, a business application backend system receives service requests from a client. If the service request is a Remote Function Call (RFC) format service request, at 320, the RFC format service request is evaluated to extract a representational state transfer format request. If the service request is an HTTP format service request, at 330, the HTTP format service request is evaluated to extract a representational state transfer format request. Thereafter, at 340, the extracted service requests are fulfilled using a protocol-independent resource controller of the backend system.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, while the integrated development environment (IDE) is described as being Eclipse and the backend system is described as being ABAP, it will be appreciated that different IDEs and other platforms database platforms can utilize aspects described herein. In addition, the logic flow depicted in the accompanying figures and described herein do not require the particular order shown, or sequential order, to achieve desirable results. Other embodiments may be within the scope of the following claims.

What is claimed is:

1. A method comprising:
receiving, by an Advanced Business Application Programming (ABAP) backend system, a plurality of service requests from a client, the plurality of service requests including at least one Remote Function Call (RFC) service request in an RFC format, wherein the ABAP backend system comprises a business application backend system encoded in ABAP language that executes services, and wherein RFC comprises an interface to the ABAP backend system;
extracting a representational state transfer (RESTful) request from the RFC service request in the RFC format;
fulfilling, by the ABAP backend system using a protocol-independent resource controller, the plurality of service requests including by executing the RESTful request extracted from the RFC service request; and
providing, by the ABAP backend system, services having RESTful application programming interfaces (APIs).

2. A method as in claim 1, wherein extracting the RESTful request from the RFC service request comprises evaluating the RFC service request in the RFC format to extract the RESTful request.

3. A method as in claim 1, wherein the plurality of service requests further includes at least one Hypertext Transfer Protocol (HTTP) service request in an HTTP format, and wherein extracting the RESTful request from the HTTP service request comprises evaluating the HTTP service request in the HTTP format to extract the RESTful request.

4. A method as in claim 1, wherein the business application backend system executes services for application development using an integrated development environment (IDE).

5. A method as in claim 4, wherein the IDE comprises an Eclipse integrated development environment platform.

6. A method as in claim 1, wherein the RESTful APIs comprises development infrastructure (DI) services using the RESTful APIs for integration of development tools, and wherein the DI services use resource controllers to provide access to resources in a data store of the business application backend system.

7. A method as in claim 1, wherein the RESTful request extracted from the RFC service request comprises a uniform resource identifiers (URIs) specifying one or more requested resources.

8. A non-transitory computer program product storing instructions, which when executed by at least one data processor forming part of at least one computing system, result in operations comprising:
receiving, by an Advanced Business Application Programming (ABAP) backend system, a plurality of service requests from a client, the plurality of service requests including at least one Remote Function Call (RFC) service request in an RFC format, wherein the ABAP backend system comprises a business application backend system encoded in ABAP language that executes services, and wherein RFC comprises an interface to the ABAP backend system;
extracting a representational state transfer (RESTful) request from the RFC service request in the RFC format;
fulfilling, by the ABAP backend system using a protocol-independent resource controller, the plurality of service requests including by executing the RESTful request extracted from the RFC service request; and
providing, by the ABAP backend system, services having RESTful application programming interfaces (APIs).

9. A computer program product as in claim 8, wherein extracting the RESTful request from the RFC service request comprises evaluating the RFC service request in the RFC format to extract the RESTful request.

10. A computer program product as in claim 8, wherein the plurality of service requests further includes at least one Hypertext Transfer Protocol (HTTP) service request in an HTTP format, and wherein extracting the RESTful request from the HTTP service request comprises evaluating the HTTP service request in the HTTP format to extract the RESTful request.

11. A computer program product as in claim 8, wherein the business application backend system executes services for application development using an integrated development environment (IDE).

12. A computer program product as in claim 11, wherein the IDE comprises an Eclipse integrated development environment platform.

13. A computer program product as in claim 8, wherein the RESTful APIs comprises development infrastructure (DI) services using the RESTful APIs for integration of development tools, and wherein the DI services use resource controllers to provide access to resources in a data store of the business application backend system.

14. A computer program product as in claim 8, wherein the RESTful requests extracted from the RFC service request comprises a uniform resource identifiers (URIs) specifying one or more requested resources.

15. A system comprising:
a client comprising at least one data processor; and
a computing system comprising at least one data processor executing an Advanced Business Application Programming (ABAP) backend system having a protocol-independent resource controller, wherein the ABAP backend system comprises a business application backend system encoded in ABAP language that executes services;
wherein the ABAP backend system:
receives a plurality of service requests from the client, the plurality of service requests including at least one Remote Function Call (RFC) service request in an RFC format, wherein RFC comprises an interface to the ABAP backend system;
extracts a representational state transfer (RESTful) request from the RFC service request in the RFC format;

fulfills, using the protocol-independent resource controller, the plurality of service requests including by executing the RESTful request extracted from the RFC service request; and provides services having RESTful application programming interfaces (APIs).

16. A system as in claim 15, wherein extracting the RESTful request from the RFC service request comprises evaluating the RFC service request in the RFC format to extract the RESTful request.

17. A system as in claim 15, wherein the plurality of service requests further includes at least one Hypertext Transfer Protocol (HTTP) service request in an HTTP format, and wherein extracting the RESTful request from the HTTP service request comprises evaluating the HTTP service request in the HTTP format to extract the RESTful request.

18. A system as in claim 15, wherein the business application backend system executes services for application development using an integrated development environment (IDE), and wherein the IDE comprises an Eclipse integrated development environment platform.

19. A system as in claim 15, wherein the RESTful APIs comprises development infrastructure (DI) services using the RESTful APIs for integration of development tools, wherein the DI services use resource controllers to provide access to resources in a data store of the business application backend system, and wherein the RESTful request extracted from the RFC service request comprises a uniform resource identifiers (URIs) specifying one or more requested resources.

20. The method as in claim 1, wherein RFC comprises the interface from the client to the ABAP backend system, the client being an ABAP client or a non-ABAP client.

21. The computer program product as in claim 8, wherein RFC comprises the interface from the client to the ABAP backend system, the client being an ABAP client or a non-ABAP client.

22. The system as in claim 15, wherein RFC comprises the interface from the client to the ABAP backend system, the client being an ABAP client or a non-ABAP client.

* * * * *